United States Patent
Bastide et al.

(10) Patent No.: US 11,049,050 B2
(45) Date of Patent: Jun. 29, 2021

(54) PROACTIVE COMMUNICATION CHANNEL CONTROLLER IN A COLLABORATIVE ENVIRONMENT

(71) Applicant: INTERNATIONAL BUSINESS MACHINES CORPORATION, Armonk, NY (US)

(72) Inventors: Paul R. Bastide, Ashland, MA (US); Lisa M. W. Bradley, Cary, NC (US); Liam Harpur, Dublin (IE); Jonathan Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/657,154

(22) Filed: Oct. 18, 2019

(65) Prior Publication Data

US 2020/0050998 A1 Feb. 13, 2020

Related U.S. Application Data

(63) Continuation of application No. 15/364,512, filed on Nov. 30, 2016, now abandoned.

(51) Int. Cl.
*H04L 12/18* (2006.01)
*G06Q 10/06* (2012.01)
(Continued)

(52) U.S. Cl.
CPC .............. *G06Q 10/063112* (2013.01); *G06Q 10/06314* (2013.01); *G06Q 10/109* (2013.01);
(Continued)

(58) Field of Classification Search
CPC ... H04L 67/104; H04L 67/306; H04L 67/327; G06F 16/358; G06F 16/215
(Continued)

(56) References Cited

U.S. PATENT DOCUMENTS 8,548,143 B2 10/2013 Vendrow
2008/0232561 A1* 9/2008 Hildreth ................. G06Q 30/02
379/88.22
(Continued)

FOREIGN PATENT DOCUMENTS

WO 2013028325 A2 2/2013

OTHER PUBLICATIONS

IBM: List of IBM Patents or Patent Applications Treated as Related (Appendix P), Dec. 20, 2019, pp. 1-2.
(Continued)

*Primary Examiner* — Tesfay Yohannes
(74) *Attorney, Agent, or Firm* — Robert C. Bunker

(57) ABSTRACT

A computer-implemented method controls communication channels in a communication network used for an electronic meeting. One or more processors collect a set of participant data related to a set of participants of an electronic meeting. One or more processors ascertain one or more sets of predicted sub-topics of the electronic meeting and then determine, based on the set of participant data and the one or more sets of predicted sub-topics, a set of leader readiness factors that identifies participants that are best qualified to lead the electronic meeting when particular sub-topics arise during the electronic meeting. In response to detecting that the particular sub-topic has arisen during the electronic meeting, a hardware communication controller opens a communication channel on the communication network that is dedicated for use by a best qualified participant to transmit information to other participants of the electronic meeting.

20 Claims, 7 Drawing Sheets

(51) Int. Cl.
*G06Q 50/00* (2012.01)
*G06Q 10/10* (2012.01)
*H04L 29/08* (2006.01)

(52) U.S. Cl.
CPC ......... *G06Q 50/01* (2013.01); *H04L 12/1822* (2013.01); *H04L 12/1831* (2013.01); *H04L 67/306* (2013.01)

(58) Field of Classification Search
USPC .................................................. 709/206, 223
See application file for complete search history.

(56) References Cited

U.S. PATENT DOCUMENTS

| 2010/0318398 | A1* | 12/2010 | Brun | G06Q 10/1093 |
| | | | | 705/7.18 |
| 2012/0290950 | A1* | 11/2012 | Rapaport | H04N 21/8358 |
| | | | | 715/753 |
| 2014/0136506 | A1* | 5/2014 | Ratner | G06F 16/951 |
| | | | | 707/706 |
| 2014/0237039 | A1 | 8/2014 | Bank | |
| 2014/0280243 | A1* | 9/2014 | Lee | G06F 16/2457 |
| | | | | 707/751 |
| 2015/0046233 | A1* | 2/2015 | Srulowitz | G06Q 10/06398 |
| | | | | 705/7.42 |
| 2015/0088888 | A1* | 3/2015 | Brennan | G06F 16/38 |
| | | | | 707/737 |
| 2015/0189532 | A1* | 7/2015 | Dimou | H04W 8/14 |
| | | | | 455/418 |
| 2015/0347966 | A1* | 12/2015 | Saunders | G06Q 10/10 |
| | | | | 705/342 |
| 2016/0063097 | A1* | 3/2016 | Brown | G06K 9/6254 |
| | | | | 707/737 |
| 2016/0094355 | A1 | 3/2016 | Waltermann | |
| 2016/0255166 | A1* | 9/2016 | Piccinini | H04L 67/24 |
| | | | | 709/206 |
| 2017/0324868 | A1* | 11/2017 | Tamblyn | H04M 3/58 |
| 2018/0152539 | A1 | 5/2018 | Bastide | |

OTHER PUBLICATIONS

Mell et al., "The NIST Definition of Cloud Computing," National Institute of Standards and Technology, Sep. 2011, p. 1-3, Special Publication 800-145.

* cited by examiner

| | |
|---|---|
| Current Topic | j2ee |
| Likely Topic | j2ee Performance |
| Meeting Topic | j2ee |
| SubTopic1 | mobile testing |
| SubTopic2 | Customer beta |
| SubTopic3 | enhancements |
| Participant1Match | 32.00% |
| Participant2Match | 12.50% |
| Participant3Match | 59.00% |
| Participant1Availability | yes |
| Participant2Availability | yes |
| Participant3Availability | no |

PROACTIVE COMMUNICATION CHANNEL CONTROLLER IN A COLLABORATIVE ENVIRONMENT

BACKGROUND

The present invention relates to the field of communication networks, and particularly to controlling the opening and closing of communication channels on communication networks used with electronic meetings. Still more particularly, the present invention relates to opening and closing communication channels on communication networks based on current sub-topics of the electronic meetings.

SUMMARY

In one or more embodiments of the present invention, a computer-implemented method controls communication channels in a communication network used for an electronic meeting. One or more processors collect a set of participant data related to a set of participants of an electronic meeting. The electronic meeting is conducted via a communication network, and each participant from the set of participants uses a different device from devices that are coupled to the communication network. The participant data describes which participant from the set of participants is best qualified to lead a discussion of a sub-topic of the main topic of the electronic meeting. One or more processors ascertain one or more sets of predicted sub-topics of the electronic meeting, where the one or more set of predicted sub-topics are derived from a main topic. One or more processors determine, based on the set of participant data and the one or more sets of predicted sub-topics, a set of leader readiness factors for the set of participants of the electronic meeting, where the set of leader readiness factors identifies participants that are best qualified to lead the electronic meeting when particular sub-topics from the one or more sets of predicted sub-topics arise during the electronic meeting. One or more processors detect that a particular sub-topic from the one or more sets of predicted sub-topics has arisen during the electronic meeting. In response to detecting that the particular sub-topic from the one or more sets of predicted sub-topics has arisen during the electronic meeting: one or more processors identify a particular participant whose level of subject-matter expertise best matches the particular sub-topic as compared to other participants from the set of participants; a hardware communication controller opens a communication channel on the communication network that is dedicated for use by the particular participant to transmit information to other participants from the set of participants; and a signal is transmitted to one or more communication signaling devices on one or more of the devices indicating that the communication channel on the communication network that is dedicated for use by the particular participant has been opened.

The present invention may also be implemented in a system and/or computer program product.

BRIEF DESCRIPTION OF THE DRAWINGS

FIG. 3 depicts an exemplary table describing rankings of various participants to an electronic meeting for taking over a presentation during a handoff;

DETAILED DESCRIPTION

Figure 1:
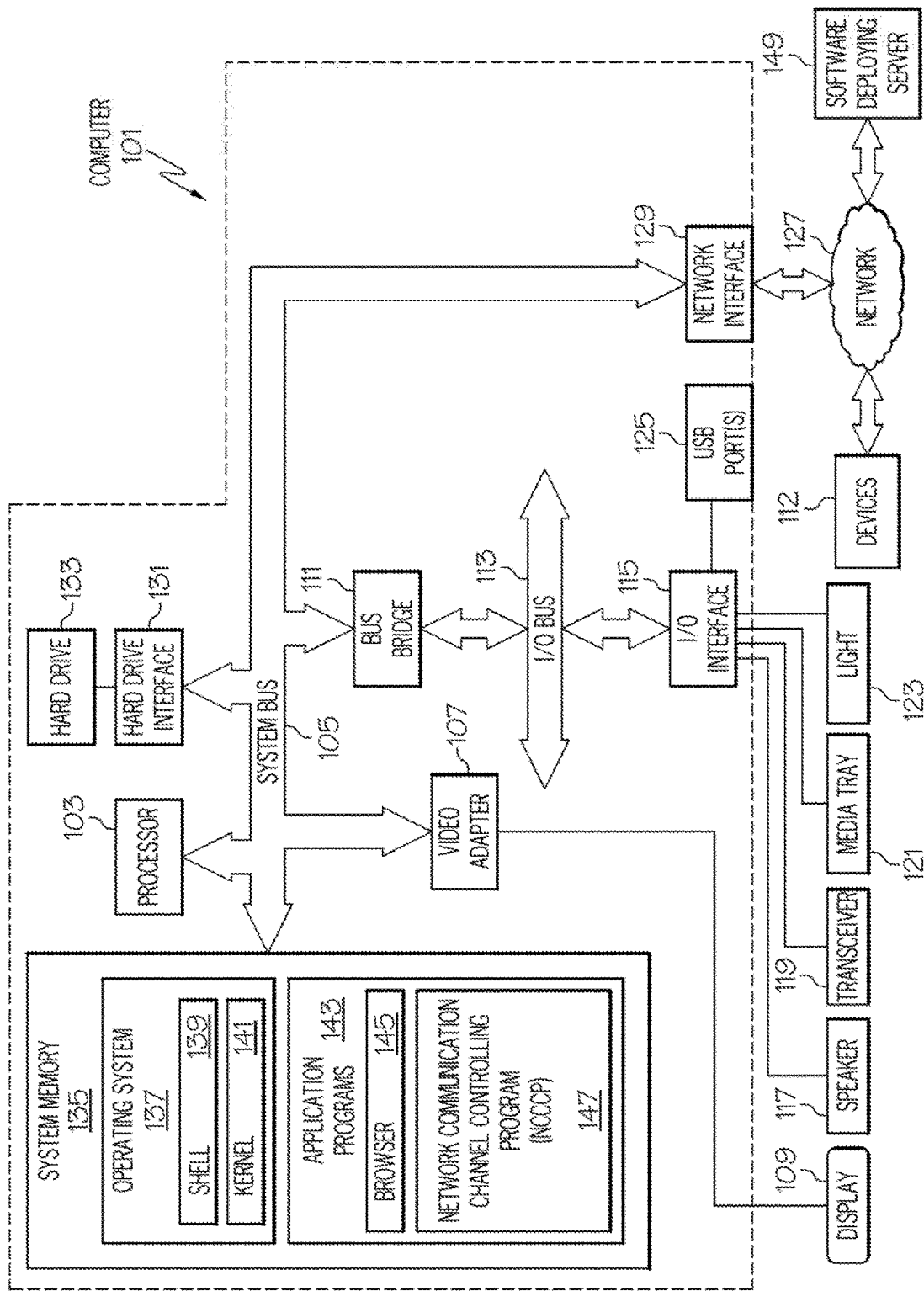
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by devices 112 and/or software deploying server 149 shown in FIG. 1, a system that supports database 214 shown in FIG. 2, and/or main topic device 301 and/or sub-topic devices 312a-312d shown in FIG. 3.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a speaker 117 (capable of reproducing human and/or environmental sounds), a transceiver 119 (capable of directly transmitting and receiving wireless signals to transceivers in other devices, a media tray 121 (which may include storage devices such as CD-ROM drives, multi-media interfaces, etc.), a light 123 (capable of being illuminated in order to indicate that a particular computer/device has a communication channel open for transmitting information onto network 126) and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., devices 112) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system.

More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Network Communication Channel Controlling Program (NCCCP) 147. NCCCP 147 includes code for implementing the processes described below, including those described in FIGS. 2-5. In one embodiment, computer 101 is able to download NCCCP 147 from software deploying server 149, including in an on-demand basis, wherein the code in NCCCP 147 is not downloaded until needed for execution. In one embodiment of the present invention, software deploying server 149 performs all of the functions associated with the present invention (including execution of NCCCP 147), thus freeing computer 101 from having to use its own internal computing resources to execute NCCCP 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

A common use case in a web conference call with multiple participants is a need to "hand-over" to another participant. This could happen if the presenter needs another user to help answer a question or if the presenter becomes unavailable (e.g. there is a network problem or a conflict). In a face-to-face meeting, visual cues often give an indication as to whether a participant wants to speak/present or remain quiet. That is, a person may use subtle eye movements to indicate their desire to speak. Likewise, if a participant looks obviously/engaged with something on their laptop it may mean they are unable to help/assist/engage immediately for a hand-over. However, such cues are not available for an electronic meeting, particularly in situations in which the participants communicate over an audio-only network.

The present invention utilizes various factors in predicting the course of a meeting, and therefore which communication channels need to be opened and when. Thus, the system determines what a current presenter is likely to discuss, what other participants, for any point-in-time, should take control of the meeting/presentation, whether such other participants are available for any point-in-time and who is best able to hand-over control, the availability of supporting materials for the proposed next presenter, and/or proactive background activities of certain participants in order to facilitate engagement of such participants.

There is limited information available immediately as to whether a participant is in a position to receive a hand-over during an electronic meeting. Participants must gather data from listening to the call and through investigating the call participants to know who is able to continue the presentation. Asking someone to continue presenting can be fraught with difficulty. That is, a certain participant/person may have technical difficulties or may not be in agreement with the main presenter about the content (or may not have expertise about the content).

Users may have the use of a Content Management System (CMS) to get information on a participant. However, the information present in the CMS may be outdated. Other solutions involve asking on the phone or side chat can be laborious and perceived as unprofessional and inefficient.

Effective e-meetings have the ability to allow the presenter to seamlessly handover to other participants. While the optimal hand-over may vary from meeting to meeting and from presenter to presenter, the present invention addresses the need for a way to ensure that a presenter does not get bogged down in a handover. Thus, the present invention presents an improved, novel, and efficient method to help hand-over within an e-meeting without breaking the flow of the presentation/discussion by utilizing real-time and historical analysis of conference and related data, and then opening up communication channels accordingly.

Thus, the present invention understands the likely flow/content of the meeting (i.e., the predicted sub-topics of the main topic of the meeting), and then proactively hands-over to an able/willing participant of the meeting by opening a dedicated communication channel for that person to use to present input to the electronic meeting.

One or more embodiments of the present invention are complemented with a number of visual queues. For example, a user interface on devices used by the participants of the electronic meeting (e-meeting) may show the participants that are most likely to be ready in the event of a hypothetical fail-over and/or hand-over. For example, based on the type of questions currently being asked and which answer is most commonly retrieved, these metrics can then be used to help drive more effective change-overs for a specific topic. In terms of implementation, where the e-meeting is active, the proposed presenter may also be given a user interface (UI) indication that he/she is a preferred candidate in the event of a hand-over. In the case of a live presentation, e-meetings (e.g., a web conference) may have a "hand-over" message that informs users that a new presenter will be available shortly. Various embodiments/implementation of the present invention may consider possible presenter actions, machine capabilities and current locations to determine which participant is the best candidate for being a next presenter to the e-meeting.

Thus, the present invention presents a system that facilitates a smooth hand-off of a presenter in an e-meeting; provides visual clues for the current presenter to know who to pass to and for the attendees to know if they are potential attendees to pass off to; and/or allow an opt-out provision so that attendees can indicate they do not want the presenter to pass-off to them, thus leading to a seamless hand-over of a meeting. The present invention thus allows the current presenter to stay focused and to not have to work in the background to find another presenter.

In one or more embodiments, the present invention data mines user profile history as a well as additional collaboration factors (e.g. current/likely meeting topic, etc.) which are used to derive a likelihood factor for whether or not a particular participant is a good candidate for taking over a meeting, which is then used for the seamless hand-over. This likelihood factor may then be used as a visual queue which may appear as part of a user interface element to indicate which individuals are presenter candidates. Additionally, profile information can store information that allows an opt-out feature for a particular participant (i.e., "please don't consider me as part of your likelihood factor calculations").

An exemplary implementation of the present invention includes the steps of 1) gathering profile type information, 2) gathering historical information, 3) starting the presentation, 4) analyzing the current main topic, 5) identifying possible pass-off presenters, and 6) passing off the presentation by opening a channel for the selected presenter.

1) Gathering Profile Type Information

A system (e.g., computer 101 shown in FIG. 1) will prompt users/participants for information about themselves, such as their name, email, company, phone number, etc. The system then matches internal and external social information about this user, such as forum entries, blogs, etc. and analyzes that data. The system also gathers expertise information of attendees. If available, the system also accesses a meeting calendar server in order to determine the availability, previous schedule, etc. of the attendees, in order to determine which attendees have calendared preparation time for discussing and/or presenting information about various sub-topics of the meeting.

2) Gathering Historical Information

The system looks for recordings of any of the preceding calls to automatically gather information on the participants of the call. The system then analyzes/determines who attended the preceding calls, who downloaded the recording of the call, who posted to related blog posts or forum posts on this topic since the call, who was active in the last call, who had any activity related to main topic of the meeting, etc.

3) Starting the Presentation

Assume that Presenter1 is presenting meeting1 via a web conference. The system uses a microphone to listen for comments or questions the presenter and participants are using, and/or analyzes visual content recognition (e.g., determines which participants are indicating an active engagement in the meeting).

4) Analyzing the Current Main Topic

The system accesses current topic and likely topic information. That is, the system not only examines the current topic in the meeting, but also predicts other sub-topics that will derive from the current/main topic. Likely sub-topic development can be ascertained based on historical analysis of similar meetings (e.g., scope of similar agendas, similar participants, time proximity, etc.) For example, a particular type of meeting may usually discuss "project milestone" towards the latter end of this type of meeting. For the current topic, audio and video of the present meeting are parsed to ascertain the current/main topic of the meeting. Thy system further categorizes the participants' interactions (for example, technical, general comment, whether it requires answer, etc.) on an on-going basis.

5) Identifying Possible Pass-Off Presenters

Possible pass-off identifiers are matched from historical data, profile information, subject matter expert/expertise (SME) skills, and the current topic analysis. Potential presenters (both participant and non-participant for the current meeting) are probed using a client side monitor to understand their readiness. For example, if a participant is currently speaking to another person, then that participant is less likely to be offered the presenter role compared to a participant who is browsing a news website related to the current meeting. Thus, meeting participants who are more likely to be engaged (e.g., is giving the meeting his/her full attention) will be identified as possible pass-off presenters. Determining the readiness of a candidate presenter to the e-meeting may utilize a module to check that the user has access (i.e., access control and physical access) to content that is likely to be needed when presenting information to the e-meeting. A server side component then performs an analysis of the current and likely topics, along with the participant readiness to give a score for each participant's readiness.

A user interface component allows potential presenters to opt-out themselves and for the presenter to perform other exemptions.

6) Passing Off the Presentation by Opening a Channel for the Selected Presenter

Assume now that Event1 occurs and results in Presenter1 not being available to continue, or not best suited to continue. Such an event may include, but is not limited to: a network outage; severely degraded network performance; topic change with degraded subject matter expertise; hardware failure; etc. This results in the occurrence of a pass-off to a participant having the best suited match by opening up a communication channel for that particular participant. In an embodiment of the present invention, a user interface or other indicator allows the presenter to know who the best suited attendee for the pass-off is. This indicator also allows the next presenter to know that he/she is about to be called upon to take over the presentation.

Figure 2:
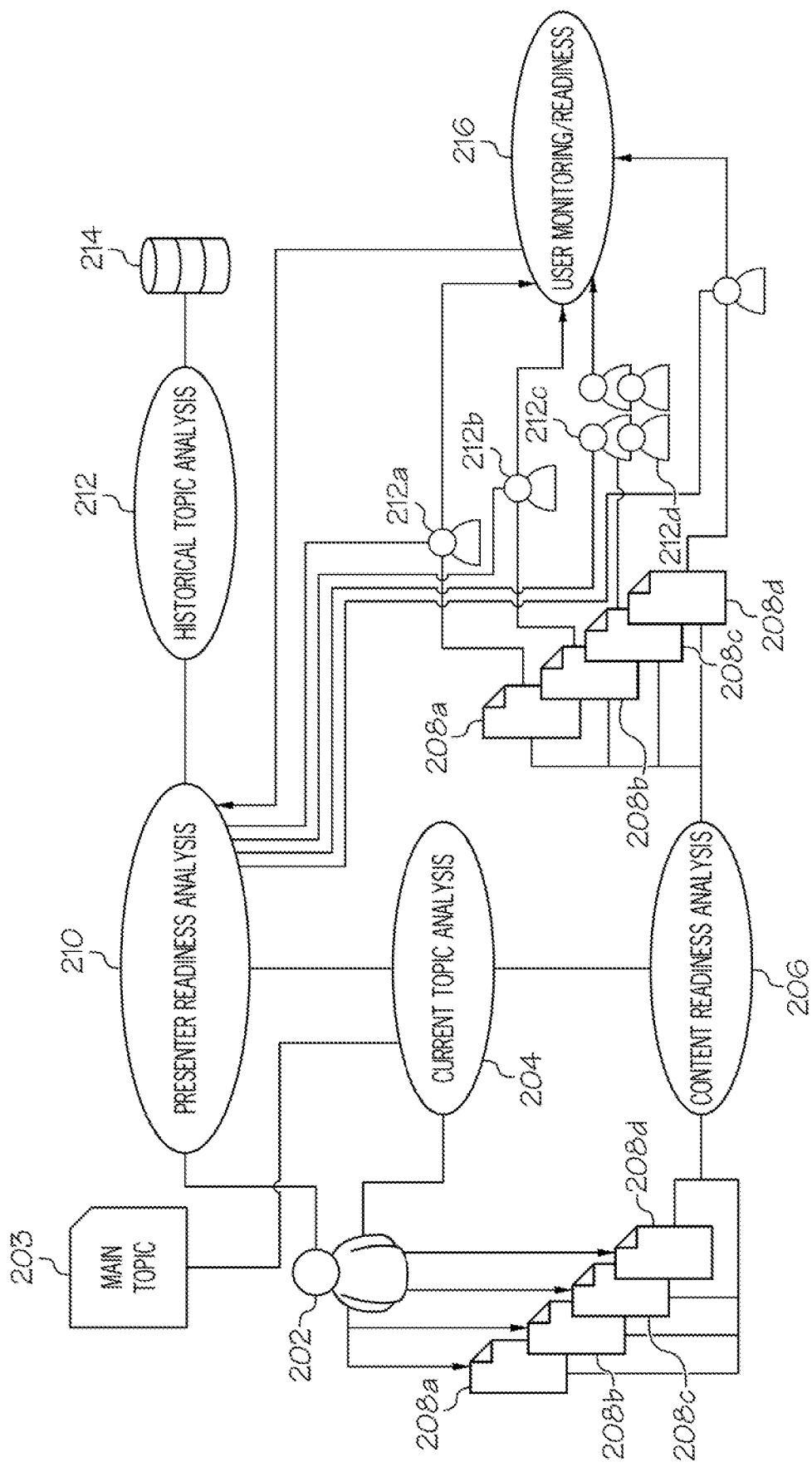
FIG. 2 illustrates an exemplary overview of the present invention.

With reference now to FIG. 2, an exemplary overview of one or more embodiments of the present invention is presented. Assume that speaker 202 has initiated an electronic meeting (e.g., a web conference, a telephone conference, etc.), and that the current/main topic is Topic 1 (depicted as main topic 203).

Current topic analysis 204 (e.g., performed by computer 101 by running NCCCP 147 shown in FIG. 1) identifies the current main topic as being main topic 203 (e.g., using text/data analysis of presentation material, comments by speaker 202, etc.), and then performs a content readiness analysis 206 that identifies and predicts sub-topics 208a-208d that may be discussed during the electronic meeting. That is, main topic 203 is an overall and/or initial topic, and sub-topics 208a-208d are topics that devolve from the main topic 203.

For example, assume that main topic 203 is about community health. As the electronic meeting progresses, various other topics/sub-topics may arise, such as health care costs, efficacy of certain treatments, etc. Such topics may be independent of one another or they may be dependent upon one another.

For example, assume that main topic 203 is still "community health". Independent factors that impact community health may be sub-topic 208a ("cost"), sub-topic 208b ("efficacy of treatment"), sub-topic 208c ("hospital architecture"), and sub-topic 208d ("staffing issues"), which may be interdependent, but are not sequential in nature. That is, cost may be interrelated to staffing issues, but there is no logical sequence that defines the predicted order of the sub-topics 208a-208d as presented during the electronic meeting. Thus, sub-topics 208a-208d are not predicted to be in any particular sequential order.

However, sub-topics 208a-208d may in fact be sequential. For example, assume again that main topic 203 is about community health, and that sub-topic 208a is about "transportation" issues (e.g., how ambulances transport a patient to a hospital). Sub-topic 208b may then be related to "hospital patient admissions", which occur after the patient arrives at the hospital (using the transportation described in sub-topic 208a). Sub-topic 208c may then be related to operation procedures (e.g., medical operation procedures) that occur after the patient is admitted (sub-topic 208b). Sub-topic 208d may then be related to discharge procedures, which occur after the patient has been treated (sub-topic 208c). Thus, sub-topics 208a-208d are predicted to occur in this sequential order.

Once the sub-topics 208a-208d are predicted, a presenter readiness analysis 210 identifies the participants 212a-212d that are best suited to take the hand-off/hand-over of the discussion when their particular area of expertise/availability arises. For example, participant 212a may be the best candidate to discuss sub-topic 208a about transportation issues, while participant 212b may be the best candidate to discuss sub-topic 208b about hospital patient admissions, etc.

In one or more embodiments of the present invention, an historical topic analysis 212 is used to match a particular participant to a particular sub-topic (e.g., matching participant 212d to sub-topic 208d). This historical topic analysis 212 examines past meetings in which the participants 212a-212d have provided input, their profiles, etc., all of which may be retrieved from a database 214.

A user monitoring/readiness logic 216 compares the profiles of the participants 212a-212d to their current state of readiness (i.e., are they present, are they at a device that is "up" and available for them to provide their input to the electronic meeting, etc.). Based on this user monitoring/readiness analysis 216, the system will selectively open up communication channels for a particular participant from participants 212a-212d when the sub-topic (from sub-topics 208a-208d) arise (as predicted) during the electronic meeting.

As shown in FIG. 3, an exemplary table 301 describing rankings of various participants to an electronic meeting for taking over a presentation during a handoff. For example, assume that a main/current topic is for the computer language J2EE, and the likely overall topic will be about J2EE performance issues. During the presentation of the main presenter (e.g., speaker 202) other sub-topics (depicted in FIG. 2 as sub-topics 208a-208d) are predicted to occur, based on who the participants to the meeting are, how they have interacted in past meetings about J2EE and/or other topics, etc. Thus, Participant1 may be the best match for SubTopic1 ("mobile testing"), based on his/her prior track record in other meetings, his/her profile, etc. That is, there is a 32.0% match between the record/profile of Participant1 to the features set by presenter readiness analysis 210 for the SubTopic1 related to "mobile testing", which is a higher match than any other participants to the electronic meeting.

Similarly, Participant 2 may be the best match for SubTopic2 ("customer beta testing"), based on his/her prior track record in other meetings, his/her profile, etc. That is, even though there is only a 12.50% match between the record/profile of Participant2 to the features set by presenter readiness analysis 210 for the SubTopic2 related to "customer beta (testing)", this is still a higher match than any other participants to the electronic meeting.

As shown in FIG. 3, Participant1 and Participant2 are both available (physically present and have access to communication hardware needed to present meeting information). However, Participant3, although an excellent candidate to talk about J2EE enhancements (since he/she has a 59.0% match to parameters set by the presenter readiness analysis 210), he/she is not available, and thus is not a candidate for presenting information related to J2EE enhancements.

Figure 4:
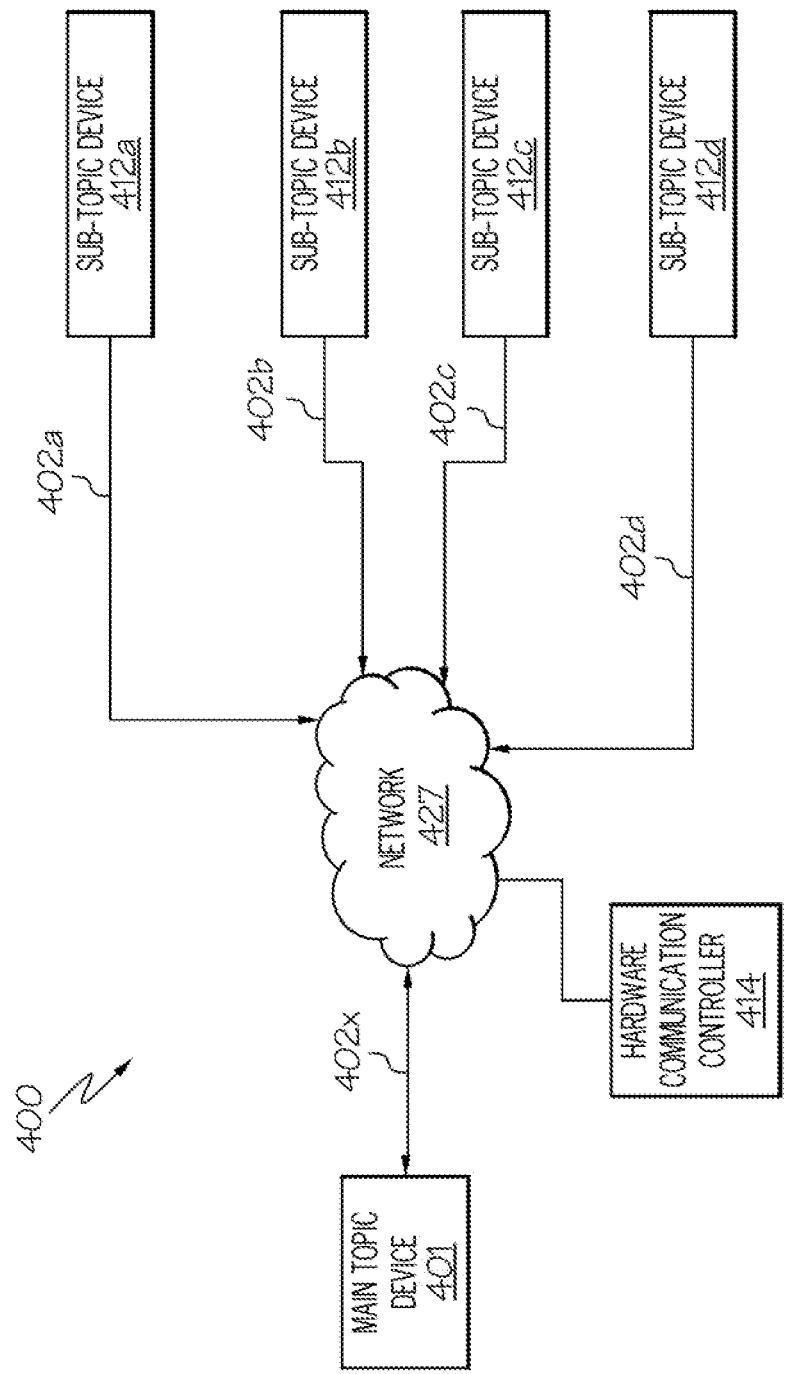
FIG. 4 depicts an exemplary communication system as controlled by one or more embodiments of the present invention.

With reference now to FIG. 4, an exemplary communication system 400 as controlled by one or more embodiments of the present invention is presented. Assume that a main topic device 401 (used by speaker 202 shown in FIG. 2) is communicating via a communication channel 402x to a network 427, which allows the speaker 202 to lead a discussion on a main topic. Assume further that only the presenter is allowed to present information to (e.g., to speak to) other participants in the electronic meeting. As such, only the speaker 202 (using main topic device 401) is initially heard during the electronic meeting.

However, at some point during the electronic meeting, a predicted sub-topic (e.g., one of the sub-topics 208a-208d shown in FIG. 2) comes up during the meeting. If speaker 202 is not the best qualified person to talk about this newly-raised (and predicted) sub-topic, then the participant from participants 212a-212d that is best qualified to speak on that sub-topic is allowed to speak to the group by a hardware communication controller 414 opening up a communication channel that is dedicated to that person. For example, if the user of sub-topic device 412a (analogous to device 112 shown in FIG. 1) from sub-topic devices 412a-412d is the best person to talk about sub-topic 208a (shown in FIG. 2), then communication channel 402a is opened by the hardware communication controller 414, communication channel 402x is (optionally) closed by the hardware communication controller 414, and the other communication channels 402b-402d are (optionally) kept closed by the hardware communication controller 414, such that only the user of sub-topic device 412a is able to speak to the meeting.

Figure 5:
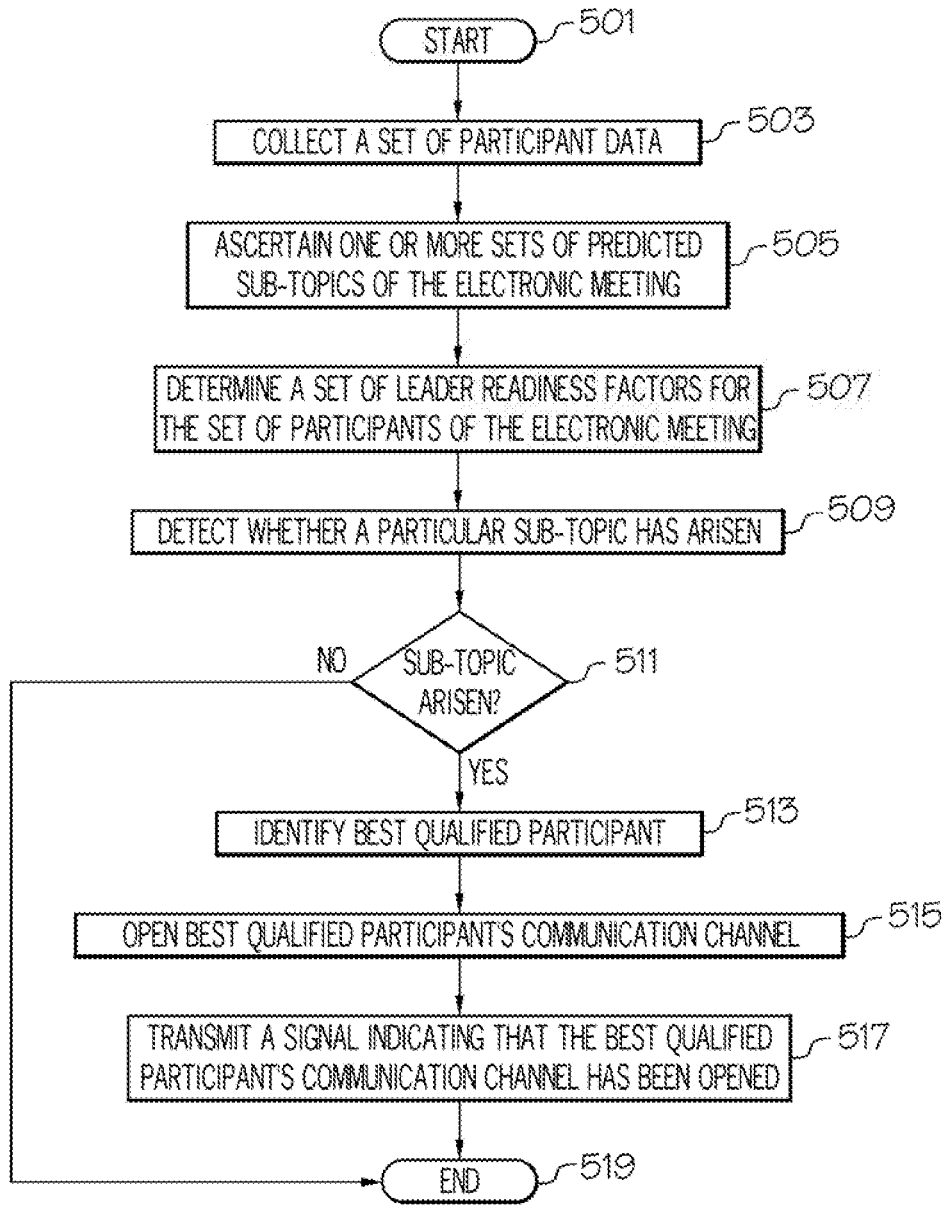
FIG. 5 is a high level flow chart of one or more steps performed by one or more processors and/or other hardware devices to control communication channels in a collaborative network environment according to one or more embodiments of the present invention.

With reference now to FIG. 5, a high level flow chart of one or more steps performed by one or more processors and/or other hardware devices to control communication channels in a collaborative network environment according to one or more embodiments of the present invention is presented.

After initiator block 501, one or more processors (e.g., within computer 101 shown in FIG. 1) collect a set of participant data related to a set of participants (e.g., participants 212a-212d shown in FIG. 2) to an electronic meeting, as described in block 503. The electronic meeting is conducted via a communication network (e.g., network 427 shown in FIG. 4). Each participant from the set of participants uses a different device from devices (e.g., sub-topic devices 412a-412d shown in FIG. 4) that are coupled to the communication network. The participant data describes which participant from the set of participants is best qualified to lead a discussion of a sub-topic of the main topic of the electronic meeting.

As described in block 505, one or more processors ascertain one or more sets of predicted sub-topics (e.g., sub-topics 208a-208d shown in FIG. 2) of the electronic meeting. As described herein, the one or more set of predicted sub-topics are derived from a main topic (e.g., main topic 203 shown in FIG. 2), and are predicted to arise during the course of the electronic meeting based on past meetings, current participants to the current meeting, etc. That is, if certain sub-topics usually (or always) arose during past meetings about a certain topic, then they are predicted to arise for a current meeting about that certain topic. This prediction can also be based on who is attending the current meeting. For example, if profiles of participants to the current meeting show that these participants have expertise in, an interest in, a concern about, etc. a certain sub-topic, then that certain sub-topic is predicted to arise during the current meeting.

As described in block 507, one or more processors determine, based on the set of participant data and the one or more sets of predicted sub-topics, a set of leader readiness factors for the set of participants of the electronic meeting. This set of leader readiness factors identifies participants that are best qualified to lead the electronic meeting when particular sub-topics from the one or more sets of predicted sub-topics arise during the electronic meeting (see FIG. 3).

As described in block 509, one or more processors detect that a particular sub-topic from the one or more sets of predicted sub-topics has arisen during the electronic meeting. For example, the predicted SubTopic1 may arise during the meeting described in FIG. 3.

In response to detecting that the particular sub-topic from the one or more sets of predicted sub-topics has arisen during the electronic meeting (query block 511), various actions occur.

As described in block 513, one or more processors identify a particular participant whose level of subject-matter expertise best matches the particular sub-topic as compared to other participants from the set of participants (e.g., Participant1 as indicated by the match percentage for Participant1Match shown in FIG. 3).

As described in block 515, a hardware communication controller (e.g., hardware communication controller 414 shown in FIG. 4) opens a communication channel (e.g., communication channel 402*a* shown in FIG. 4) that is dedicated for use (on the communication network) by the particular participant (e.g., the user of sub-topic device 412*a*) to transmit information to other participants from the set of participants (e.g., users of the main topic device 401 and/or sub-topic devices 412*b*-412*d* shown in FIG. 4).

As described in block 517, a signal is transmitted to one or more communication signaling devices (e.g., speaker 117, light 123, an icon on display 109, etc. as shown in FIG. 1) on one or more of the devices (e.g., one or more of the main topic device 401 and/or one or more of the sub-topic devices 412*a*-412*d* shown in FIG. 4) indicating that the communication channel (e.g., communication channel 402*a*) that is dedicated for use by the particular participant (e.g., user of sub-topic device 412*a*) has been opened.

The flow-chart ends at terminator block 519.

In an embodiment of the present invention and as described herein, the one or more sets of predicted sub-topics of the electronic meeting are sets of sequential sub-topics, such that each sub-topic is derived from a preceding sub-topic from the set of predicted sub-topics.

In an embodiment of the present invention, in response to detecting that the particular sub-topic from the one or more sets of predicted sub-topics has arisen during the electronic meeting, the hardware communication controller closes all other communication channels on the communication network that are not dedicated for use by the particular participant. That is, if communication channel 402*a* is opened, then communication channel 402*x* and communication channels 402*b*-402*d* are all closed, so that only the user of sub-topic device 412*a* is able to speak to or otherwise present information to the group.

As described herein and in an embodiment of the present invention, the signal on the one or more of the devices indicating that the communication channel on the communication network that is dedicated for use by the particular participant has been opened is a visual indicator (e.g., by illuminating light 123 shown in FIG. 1).

In an embodiment of the present invention, one or more processors detect a triggering event from a group consisting of a network error event, a new main topic presentation event, and a hardware error event in one or more of the devices. In response to detecting the triggering event, one or more processors modify a leadership arrangement of the electronic meeting by transitioning leadership from a current leader to another participant of the electronic meeting. That is, if there is a network error event (e.g., communication channel 402*x* breaks down—"network error event"), or one of the participants suggests that an entirely new main topic be discussed during the meeting ("a new main topic presentation event"), or main topic device 401 crashes ("a hardware error event in one or more of the devices"), then leadership of the meeting will hand-over to another device/participant to the meeting.

In an embodiment of the present invention, one or more processors provide an opt-out feature to the particular participant. Upon receiving a selection of the opt-out feature from the particular participant, the particular participant is bypassed by closing the communication channel on the communication network that is dedicated for use by the particular participant and opening another communication channel on the communication network that is dedicated for use by another participant to the electronic meeting. That is, if the user of sub-topic device 412*a* tells the user of the main topic device 401 that he/she does not want to contribute to the discussion of the meeting, then the presenter readiness analysis 210 will bypass that opting-out user, such that he/she is not a candidate for leading the discussion at any point during the meeting.

In an embodiment of the present invention, the participant data is from a group consisting of profile information for the participants (e.g., from a database such as database 214 shown in FIG. 2 indicating the interests of the participants), social media information for the participants (e.g., by data mining social media content provided by and/or about the participants), subject matter expertise information for the participants (i.e., specific profile information related to the subject matter expertise held by a particular participant), calendar information for the participants (e.g., calendars that describe whether a certain participant is going to be available for the entire meeting, and/or that describe what meetings that certain participant attended in the past), and historical electronic meeting engagement information for the participants (i.e., a record of any leadership role a particular participant of the present meeting provided during past meetings).

In an embodiment of the present invention, ascertaining the predicted sub-topics is based on one or more parameters from a group consisting of an historical meeting agenda (i.e., what sub-topics arose during meetings about a similar topic as the current meeting), an historical participant interaction (e.g., was there a sharing of leadership participation during past meetings), and an historical temporal proximity (i.e., how recently was the last meeting held regarding the topic of the current meeting).

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
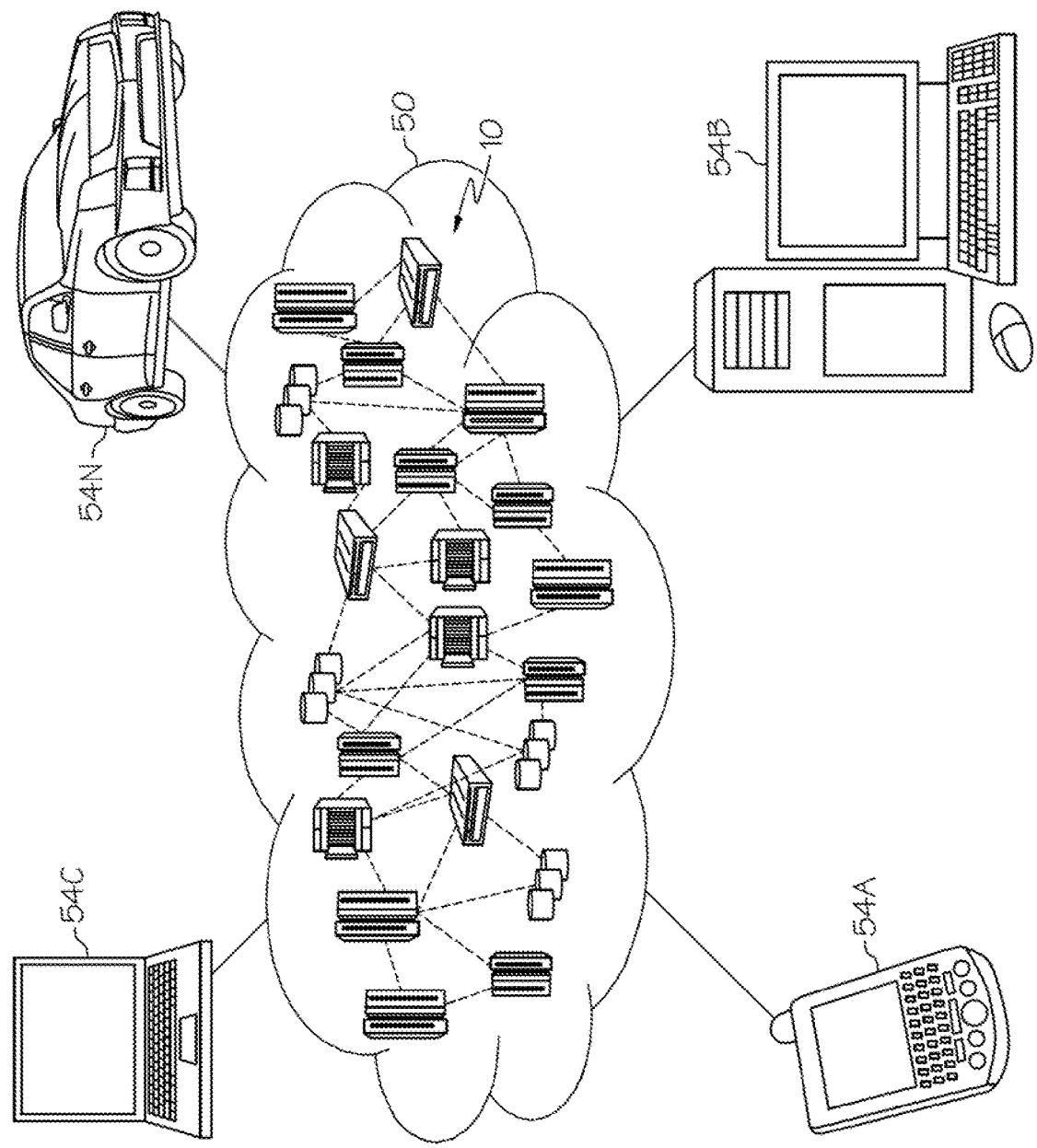
FIG. 6 depicts a cloud computing environment according to an embodiment of the present invention.

Referring now to FIG. 6, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
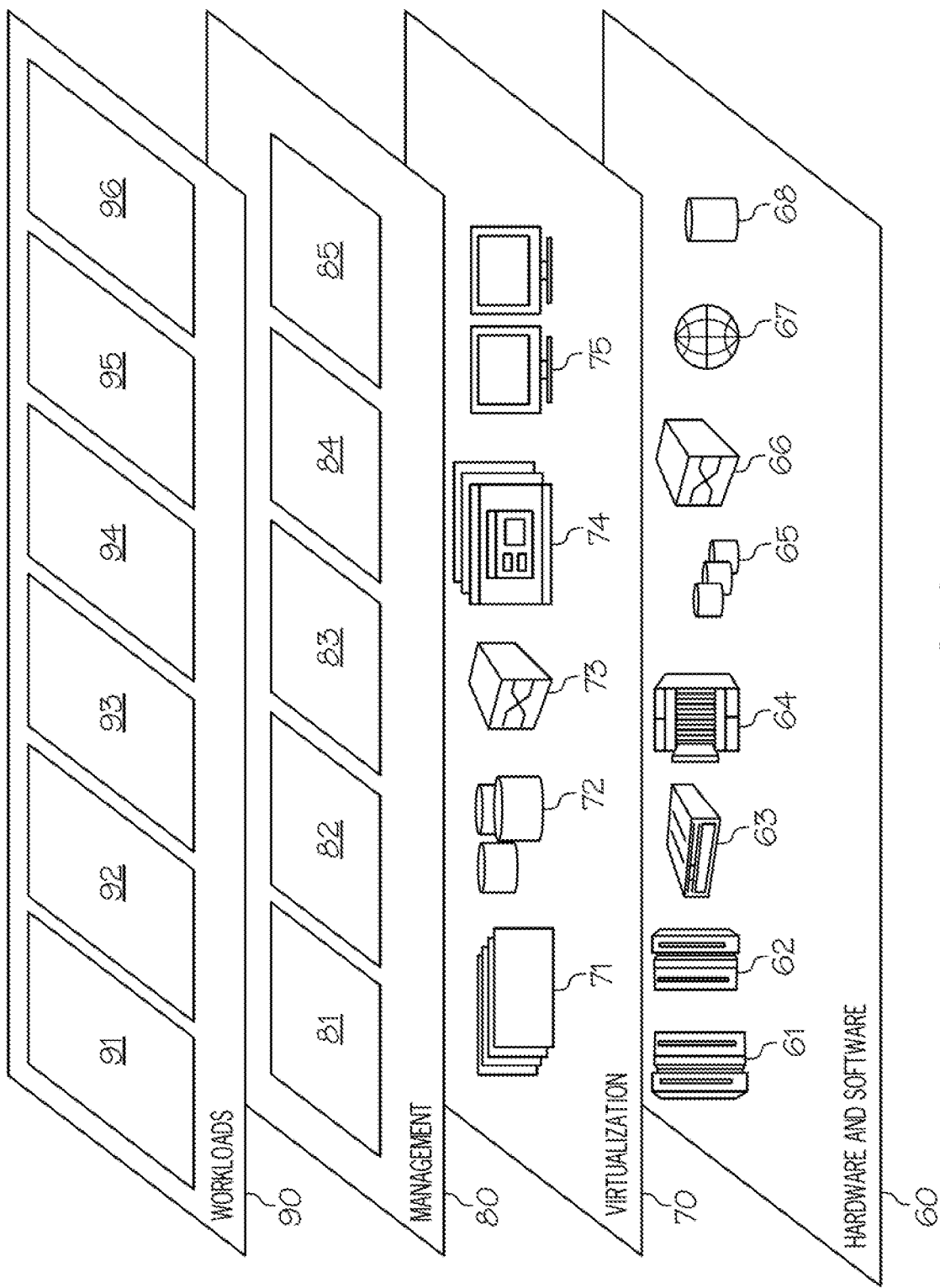
FIG. 7 depicts abstraction model layers of a cloud computing environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communication channel control processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of controlling communication channels in a communication network used for an electronic meeting, the computer-implemented method comprising:
   collecting, by one or more processors, a set of participant data related to a set of participants of an electronic meeting, wherein the electronic meeting is conducted via a communication network, and wherein the set of participant data describes which participant from the set of participants is best qualified to lead a discussion of a sub-topic of a main topic of the electronic meeting;
   determining the main topic of the electronic meeting based on analyzing verbal comments made by a participant from the set of participants during the electronic meeting;
   ascertaining, by the one or more processors, one or more sets of predicted sub-topics of the electronic meeting, wherein the one or more sets of predicted sub-topics are derived from the main topic;
   determining, by the one or more processors and based on the set of participant data and the one or more sets of predicted sub-topics, a set of leader readiness factors for the set of participants of the electronic meeting, wherein the set of leader readiness factors identifies participants that are best qualified to lead the electronic meeting;
   detecting, by the one or more processors, that a particular sub-topic from the one or more sets of predicted sub-topics has arisen during the electronic meeting;
   in response to detecting that the particular sub-topic from the one or more sets of predicted sub-topics has arisen during the electronic meeting:
      identifying, by the one or more processors, a particular participant whose level of subject-matter expertise best matches the particular sub-topic as compared to other participants from the set of participants; and
      opening, by a hardware communication controller, a communication channel that is dedicated for use, on the communication network, by the particular participant to transmit information to other participants from the set of participants.

2. The computer-implemented method of claim 1, wherein the one or more sets of predicted sub-topics of the electronic meeting are sets of sequential sub-topics, wherein each sub-topic is derived from a preceding sub-topic from the one or more sets of predicted sub-topics.

3. The computer-implemented method of claim 1, further comprising:
   in response to detecting that the particular sub-topic from the one or more sets of predicted sub-topics has arisen during the electronic meeting, closing by the hardware communication controller, all other communication channels on the communication network that are not dedicated for use by the particular participant.

4. The computer-implemented method of claim 1, further comprising:
   detecting, by one or more processors, a triggering event, wherein the triggering event is from a group consisting of a network error event, a new main topic presentation event, and a hardware error event in one or more of the devices; and
   in response to detecting the triggering event, modifying, by one or more processors, a leadership arrangement of the electronic meeting by transitioning leadership from a current leader to another participant of the electronic meeting.

5. The computer-implemented method of claim 1, further comprising:
   providing, by one or more processors, an opt-out feature to the particular participant;
   receiving, by one or more processors, a selection of the opt-out feature by the particular participant; and
   in response to receiving the selection of the opt-out feature by the particular participant, bypassing the particular participant by closing the communication channel on the communication network that is dedicated for use by the particular participant and opening another communication channel on the communication network that is dedicated for use by another participant of the electronic meeting.

6. The computer-implemented method of claim 1, wherein the participant data is from a group consisting of profile information for the participants, social media information for the participants, subject matter expertise information for the participants, calendar information for the participants, and historical electronic meeting engagement information for the participants.

7. The computer-implemented method of claim 1, wherein ascertaining the predicted sub-topics is based on one or more parameters from a group consisting of an historical meeting agenda, an historical participant interaction, and an historical temporal proximity.

8. A computer program product comprising one or more computer readable storage mediums, and program instructions stored on at least one of the one or more storage mediums, the stored program instructions comprising:
   program instructions to collect a set of participant data related to a set of participants of an electronic meeting, and wherein the set of participant data describes which participant from the set of participants is best qualified to lead a discussion of a sub-topic of a main topic of the electronic meeting;
   program instructions to determine the main topic of the electronic meeting based on analyzing verbal comments made by a participant from the set of participants during the electronic meeting;
   program instructions to ascertain one or more sets of predicted sub-topics of the electronic meeting, wherein the one or more sets of predicted sub-topics are derived from the main topic;
   program instructions to determine, based on the set of participant data and the one or more sets of predicted sub-topics, a set of leader readiness factors for the set of participants of the electronic meeting, wherein the set of leader readiness factors identifies participants that are best qualified to lead the electronic meeting;
   program instructions to detect that a particular sub-topic from the one or more sets of predicted sub-topics has arisen during the electronic meeting;
   program instructions to, in response to detecting that the particular sub-topic from the one or more sets of predicted sub-topics has arisen during the electronic meeting:
      identify a particular participant whose level of subject-matter expertise best matches the particular sub-topic as compared to other participants from the set of participants; and
      open, by a hardware communication controller, a communication channel that is dedicated for use, on the communication network, by the particular participant to transmit information to other participants from the set of participants.

9. The computer program product of claim 8, wherein the one or more sets of predicted sub-topics of the electronic meeting are sets of sequential sub-topics, wherein each sub-topic is derived from a preceding sub-topic from the one or more sets of predicted sub-topics.

10. The computer program product of claim 8, further comprising:
    program instructions to, in response to detecting that the particular sub-topic from the one or more sets of predicted sub-topics has arisen during the electronic meeting, close all other communication channels on the communication network that are not dedicated for use by the particular participant.

11. The computer program product of claim 8, further comprising:
    program instructions to detect a triggering event, wherein the triggering event is from a group consisting of a network error event, a new main topic presentation event, and a hardware error event in one or more of the devices; and
    program instructions to, in response to detecting the triggering event, modify a leadership arrangement of the electronic meeting by transitioning leadership from a current leader to another participant of the electronic meeting.

12. The computer program product of claim 8, further comprising:
    program instructions to provide an opt-out feature to the particular participant;
    program instructions to receive a selection of the opt-out feature by the particular participant; and
    program instructions to, in response to receiving the selection of the opt-out feature by the particular participant, bypass the particular participant by closing the communication channel on the communication network that is dedicated for use by the particular participant and opening another communication channel on the communication network that is dedicated for use by another participant of the electronic meeting.

13. The computer program product of claim 8, wherein the participant data is from a group consisting of profile information for the participants, social media information for the participants, subject matter expertise information for the participants, calendar information for the participants, and historical electronic meeting engagement information for the participants.

14. The computer program product of claim 8, wherein ascertaining the predicted sub-topics is based on one or more parameters from a group consisting of an historical meeting agenda, an historical participant interaction, and an historical temporal proximity.

15. The computer program product of claim 8, wherein the program instructions are provided as a service in a cloud environment.

16. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to collect a set of participant data related to a set of participants of an electronic meeting, wherein the electronic meeting is conducted via a communication network, and wherein the set of participant data describes which participant from the set of participants is best qualified to lead a discussion of a sub-topic of a main topic of the electronic meeting;

program instructions to determine the main topic of the electronic meeting based on analyzing verbal comments made by a participant from the set of participants during the electronic meeting;

program instructions to ascertain one or more sets of predicted sub-topics of the electronic meeting, wherein the one or more sets of predicted sub-topics are derived from the main topic;

program instructions to determine, based on the set of participant data and the one or more sets of predicted sub-topics, a set of leader readiness factors for the set of participants of the electronic meeting, wherein the set of leader readiness factors identifies participants that are best qualified to lead the electronic meeting;

program instructions to detect that a particular sub-topic from the one or more sets of predicted sub-topics has arisen during the electronic meeting;

program instructions to, in response to detecting that the particular sub-topic from the one or more sets of predicted sub-topics has arisen during the electronic meeting:

identify a particular participant whose level of subject-matter expertise best matches the particular sub-topic as compared to other participants from the set of participants; and open, by use of a hardware communication controller, a communication channel that is dedicated for use, on the communication network, by the particular participant to transmit information to other participants from the set of participants.

17. The computer system of claim 16, wherein the one or more sets of predicted sub-topics of the electronic meeting are sets of sequential sub-topics, wherein each sub-topic is derived from a preceding sub-topic from the one or more sets of predicted sub-topics.

18. The computer system of claim 16, further comprising:

program instructions to provide an opt-out feature to the particular participant;

program instructions to receive a selection of the opt-out feature by the particular participant; and program instructions to, in response to receiving the selection of the opt-out feature by the particular participant, bypass the particular participant by closing the communication channel on the communication network that is dedicated for use by the particular participant and opening another communication channel on the communication network that is dedicated for use by another participant of the electronic meeting.

19. The computer system of claim 16, further comprising:

program instructions to detect a triggering event, wherein the triggering event is from a group consisting of a network error event, a new main topic presentation event, and a hardware error event in one or more of the devices; and program instructions to, in response to detecting the triggering event, modify a leadership arrangement of the electronic meeting by transitioning leadership from a current leader to another participant of the electronic meeting.

20. The computer system of claim 16, further comprising:

program instructions to provide an opt-out feature to the particular participant;

program instructions to receive a selection of the opt-out feature by the particular participant; and program instructions to, in response to receiving the selection of the opt-out feature by the particular participant, bypass the particular participant by closing the communication channel on the communication network that is dedicated for use by the particular participant and opening another communication channel on the communication network that is dedicated for use by another participant of the electronic meeting.

* * * * *